United States Patent [19]

Kortenbrede

[11] Patent Number: 5,411,190
[45] Date of Patent: May 2, 1995

[54] LUGGAGE CARRIER FOR A TWO-WHEELED VEHICLE

[75] Inventor: Ludger Kortenbrede, Telgte, Germany

[73] Assignee: Aug. Winkhaus GmbH & Co. KG, Telgte, Germany

[21] Appl. No.: 940,032

[22] Filed: Sep. 3, 1992

[30] Foreign Application Priority Data

Sep. 6, 1991 [DE] Germany ............ 41 29 729.6
Nov. 12, 1991 [EP] European Pat. Off. ............ 91119266

[51] Int. Cl.$^6$ .............................................. B62J 7/04
[52] U.S. Cl. ........................................ 224/39; 224/31
[58] Field of Search .............. 224/39, 32 R, 32 A, 224/33 R, 33 A, 30 R, 31

[56] References Cited

U.S. PATENT DOCUMENTS

| | | | |
|---|---|---|---|
| 4,154,382 | 5/1979 | Blackburn | 224/39 |
| 4,350,361 | 9/1982 | Fuji | 280/289 A |
| 4,383,625 | 5/1983 | Kiang | 224/39 |
| 4,410,116 | 10/1983 | Mattei | 224/35 R |
| 4,429,818 | 2/1984 | Patterson et al. | |
| 4,964,551 | 10/1990 | O'Donovan et al. | 224/39 |
| 5,257,727 | 11/1993 | Chen | 224/39 |

FOREIGN PATENT DOCUMENTS

| | | |
|---|---|---|
| 0337552 | 10/1989 | European Pat. Off. . |
| 0343321 | 11/1989 | European Pat. Off. . |
| 1143017 | 9/1957 | France . |
| 50346 | 1/1890 | Germany . |
| 430384 | 6/1926 | Germany . |
| 616511 | 7/1935 | Germany . |
| 838407 | 6/1952 | Germany . |
| 2946353 | 5/1981 | Germany . |
| 8225341 | 12/1982 | Germany . |
| 3224589 | 6/1983 | Germany . |
| 3324621 | 1/1985 | Germany . |
| 8319685 | 10/1985 | Germany . |
| 3430427 | 2/1986 | Germany . |
| 3513878 | 4/1986 | Germany . |
| 3601387 | 7/1987 | Germany . |
| 3817396 | 11/1989 | Germany . |
| 9100567 | 5/1991 | Germany . |
| 9007918 | 10/1991 | Germany . |
| 8800908 | 11/1989 | Netherlands . |
| 309083 | 10/1955 | Switzerland . |
| 721733 | 1/1955 | United Kingdom . |
| 2178383 | 2/1987 | United Kingdom . |
| 2180513 | 4/1987 | United Kingdom . |

OTHER PUBLICATIONS

Taiwan Bicycles & Parts Guide 1990-91, Apr. 1990, p. 593.

*Primary Examiner*—Linda J. Sholl
*Attorney, Agent, or Firm*—Brumbaugh, Graves, Donohue & Raymond

[57] ABSTRACT

A luggage carrier which can be adapted to different sizes of bicycle frames and shapes is provided. A supporting frame of the luggage carrier is supported in the region of the rear wheel bearing by supporting frame supports. The front end region of the supporting frame is connected by means of a swivelling part to a pair of bars of the bicycle frame extending from the region of the rear wheel bearing to the upper end region of a saddle tube. The position of the swivelling part is adjustable along the length of the supporting frame, and the swivelling part is secured at a desired position for operation. The swivelling part is swivellable around an axis orthogonal to the longitudinal central plane of the luggage carrier.

31 Claims, 5 Drawing Sheets

LUGGAGE CARRIER FOR A TWO-WHEELED VEHICLE

BACKGROUND OF THE INVENTION

The invention relates to a luggage carrier for a two-wheeled vehicle comprising a carrying frame, with carrying frame supports connected with the frame for supporting the frame on bicycle frames, particularly in the area of their wheel hubs, and connecting means between the supporting frame and a pair of fork bars of the bicycle frame which extends from the upper end region of a saddle pillar of the bicycle frame to the hub area of the bicycle frame.

STATEMENT OF THE PRIOR ART

Bicycle frames, with a view to being suited in optimum fashion to body sizes and individual requirements of cyclists, are made in a plurality of sizes and shape gradations. This fact, in connection with the manufacture of components and particularly of luggage carriers, makes it necessary to make a plurality of adapted components and luggage carriers, to be kept in store and to be sold.

OBJECT OF THE INVENTION

The invention has for its object to provide a luggage carrier which, within wide limits, can be adapted to different sizes of bicycle frames and shapes, so that, with a single or with a few luggage carrier constructions, it may be possible to cover the whole range of sizes and shapes of bicycle frames.

SUMMARY OF THE INVENTION

To achieve this object it is proposed according to the invention that the connection means should comprise at least one swivelling part which is swivellable with a first end on the supporting frame around a swivelling axis substantially orthogonal to the vertical longitudinal central plane of the supporting frame, and adjustable and securable in the longitudinal direction of the supporting frame opposite said frame, and which can be secured by a second end to the pair of fork bars.

With the construction according to the invention it is in particular possible, by means of the longitudinal displacement of the swivelling part in the longitudinal direction of the supporting frame, to provide an adaptation to various inclinations of the pair of fork bars, and by means of different swivelling adjustments of the swivelling part around the orthogonal swivelling axis, to find the respectively predetermined securing point on the rear fork. In this way it can be ensured that the inclination of the load-receiving area of the supporting frame with respect to the horizontal can in each instance be adjusted as desired, particularly parallel with the horizontal or with slight inclination forwards and downwards.

It is in principle possible to provide two individual swivelling arms spaced in the direction of the swivelling axis. In this case the second ends of the individual swivelling arms can be secured respectively in one bar of the pair of fork bars, substantially in the manner that the second ends of the individual swivelling arms are angled into one plane substantially parallel with the plane of the pair of fork bars, and that these angled second ends of the individual swivelling arms are provided with holes intended to receive screws which can be brought in alignment with a screw hole of a pair of fork bars, and subsequently can be connected by means of screw bolts with the respective fork bar.

A still subsisting need for adaptation may be met in that the angled second ends of the individual swivelling arms are swivellable, particularly by the bending of the material, relative to the principal longitudinal extension of the individual swivelling arms. The individual swivelling arms may be mounted with their first ends on the longitudinal bars of the respective supporting frame.

According to another and preferred form of embodiment it is provided that the swivelling part should be formed by an approximately U-shaped swivelling shackle, the legs of which form first ends connected with the supporting frame, and the web of which forms a second end connectable with the pair of fork bars. In this case, it is possible to mount on the web an assembly bracket for connection with a bridging bracket (Pletscher web) of the pair of fork bars. The assembly bracket may be provided for this purpose with at least one fixing hole, which can be brought in alignment with a securing hole of the bridging bracket, whereupon a securing bolt can be inserted into the aligned securing holes.

An additional need for adaptation can, with the arrangement, be met in that the assembly bracket is swivellable with respect to the U-shaped shackle plane of the channel-shaped swivelling part. This swivellability may be ensured either by bending or by the fact that the assembly bracket is swivellably mounted on the web of the U-shaped shackle. A swivellable assembly bracket may be easily produced by making the assembly bracket out of a two-layer metal strip, which is widened into a bearing eye in the crown region.

The first, that is to say the end of the swivelling part facing the supporting frame, may be mounted swivellably in a swivelling and sliding unit, and this swivelling and sliding unit may be slidably and securably mounted on a longitudinal bar of the supporting frame, particularly on one of two lateral longitudinal delimiting bars of the supporting frame. The securing of the swivelling and sliding unit on the respective longitudinal bar may be effected by force or/and by positive locking, substantially in the manner that the swivelling and sliding unit has a partly opened sliding guide for the respective longitudinal bar and that the opening area of this sliding guide is covered by a clamping plate which can be pressed against the respective longitudinal bar by means of a clamping screw. In this way, for the positive securing on the clamping plate and the respective longitudinal bar, it will be possible to provide cooperating locking means, for example locking ribs on the clamping plate and locking slots on the respective longitudinal bar.

The swivellable mounting of the first end of the swivelling part in at least one swivelling and sliding unit may be effected by means of a clamping screw which, along with the mounting function, has the function of fixing the swivelling and sliding unit on the respective longitudinal bar. Thus, the first end of the swivelling part may be received in a receiving slot of the swivelling and sliding unit compressible by the clamping screw, substantially in the manner that the clamping screw, with one end, particularly with a screw head, engages on a clamping plate with the respective longitudinal bar, and with its other end, particularly with a nut, applies against a defining wall of a slot receiving the first end of the swivelling part.

It is not absolutely necessary, in the ready-to-use condition, to secure the swivelling part on the supporting frame against swivelling. The decision as to whether securing against swivelling is effected depends upon the overall kinematics of the luggage carrier. If the supporting frame supports of the luggage carrier are rigidly connected with the supporting frame, it will not be necessary, as a rule, to secure the swivelling part(s) during operation against swivelling relative to the supporting frame, as, then, actually, also when the swivelling part is not prevented from swivelling, a rigid kinematic system is provided, which consists of the pair of bars of the bicycle frame, the swivelling part, the supporting frame and the supporting frame supports. However, if the supporting frame supports are swivellably mounted on the supporting frame, so that they can be folded for transport onto the supporting frame plane, then, for a definite and unmovable securing of the luggage carrier on the bicycle frame, it will be necessary as a rule to block the swivelling part(s) in the operative state against swivelling relative to the supporting frame around the orthogonal swivelling axis. This locking may be effected—as already indicated—in that the first end(s) of the swivelling part(s) are secured on the swivelling and sliding unit, particularly clamped in the receiving slot of the unit, preferably by means of the same clamping screw which also serves for the swivelling mounting of the respective swivelling part and securing against sliding of the respective swivelling and sliding unit.

The supporting frame can be equipped with all usual securing means for the securing of luggage carried on the supporting frame. It may be further designed as a carrier for side panniers. In addition, the supporting frame—as also known from German Utility Model Specification 91 00 567—may be designed as a carrier for a bicycle lock, particularly a clip lock. With respect to this last function, it is conceivable that, on the supporting frame under its luggage carrying surface, a sliding guide for a stirrup of a clip lock could be mounted, preferably in such a way that the clip lock be insertable from the rear end of the supporting frame in the longitudinal direction of the supporting frame into the sliding guide until it comes to cause a locking member of a clip lock to act on a stop of the supporting frame, and preferably until the engagement of a security device preventing the unintended issuing of the clip lock out of the sliding guide.

With the aid of the swivellable, slidable and securable swivelling parts proposed according to the invention, it is possible—as already established hereinabove—to cover a wide range of forms and sizes of bicycle frames. It is even possible, with one and the same model of a luggage carrier according to the invention, to equip bicycle frames with different wheel sizes of, e.g., 26 inch and 28 inch. It may also happen on occasion that on bicycles with 26" wheels relatively thick types and also relatively supporting mudguard constructions (mountain bikes) are provided, so that the supporting frame supports basically dimensioned for 28' wheels will frequently be suitable also for bicycles with 26' wheels. However, for further adaptation it is also possible to make the supporting frame supports adjustable in length, for example telescopically, and to secure them to the length desired from time to time. In this way a universal luggage carrier is obtained which can be used independently of the wheel fitting of the particular bicycle, and independently of the frame shape and frame size of the particular bicycle.

The various features of novelty which characterize the invention are pointed out with particularity in the claims annexed and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which.

DETAILED DESCRIPTION OF THE PREFERRED EMBODIMENT

Figure 1:
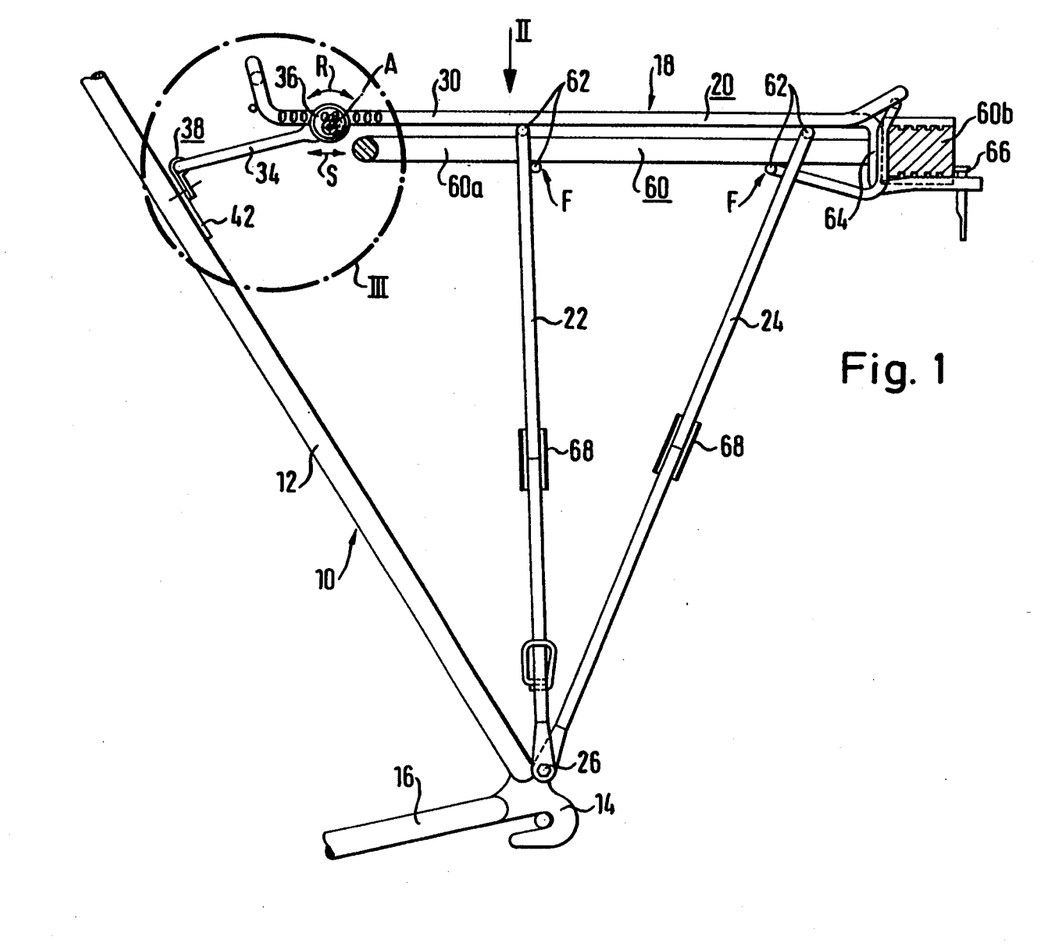
FIG. 1 is a side view of the rear part of a bicycle with a luggage carrier constructed according to the invention.

In FIG. 1 the bicycle frame is quite generally denoted by 10. The observer will recognize a first pair of bars 12 which lead from a rear wheel mounting point 14 to the upper end region of a saddle tube and a second pair of bars 16 which leads from the rear wheel mounting point 14 to the bottom bracket bearing.

Figure 2:
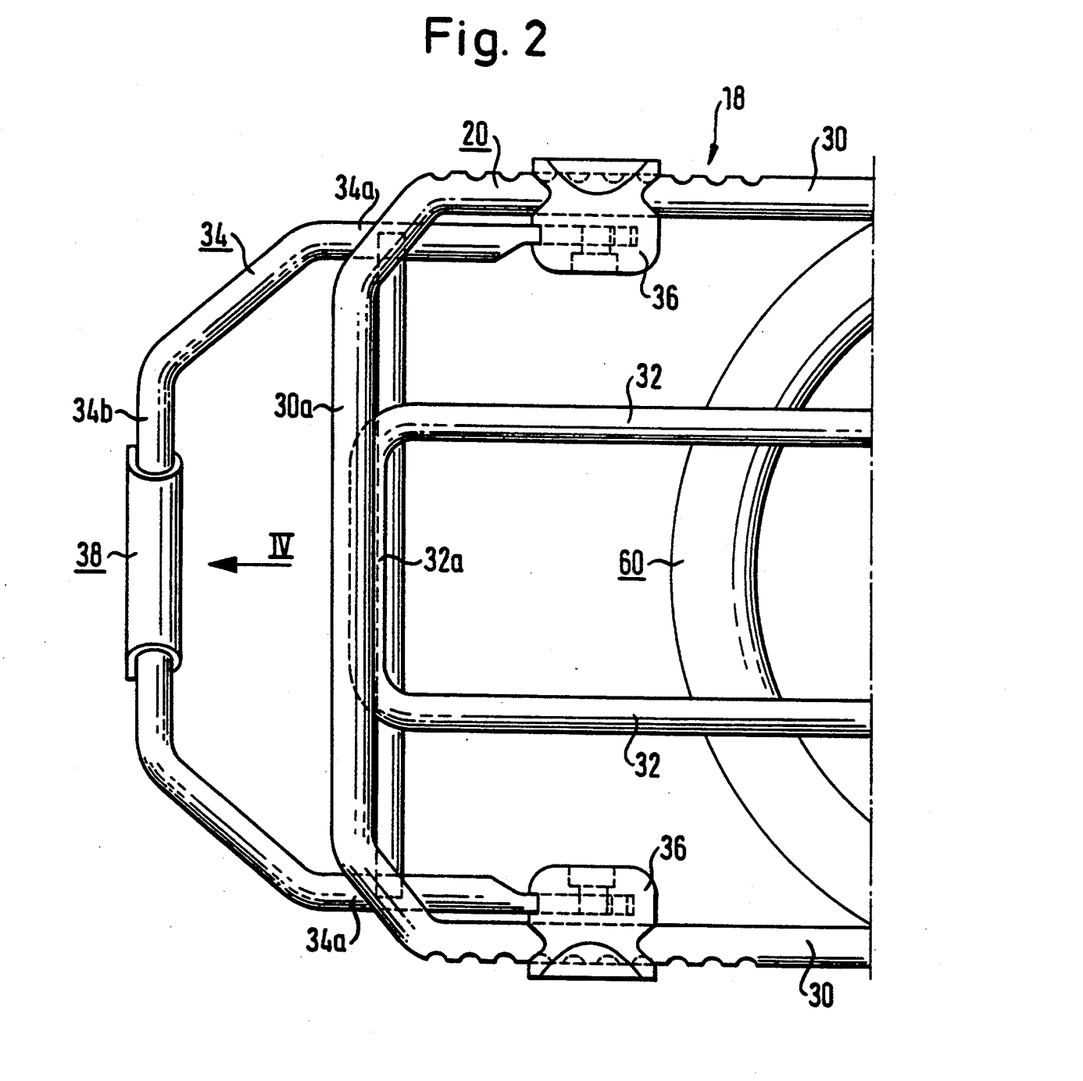
FIG. 2 is a top view of the luggage carrier of FIG. I in the direction of arrow II of FIG. 1.

The luggage carrier is quite generally denoted by 18. This luggage carrier 18 comprises a supporting frame 20 and two pairs of supporting frame supports 22 and 24. The pairs of supporting frame supports 22 and 24 are for example rigidly mounted on the supporting frame 20 and lead to the rear wheel mounting point 14 where they can be secured by special screws 26. It must not be ruled out, however, that the pairs of supporting frame supports 22, 24 are secured by the securing means which are used for securing the rear wheel in the area of the rear wheel mounting point 14. The supporting frame 20—as will be seen in FIG. 2—is constructed with two outer longitudinal bars 30 and two inner longitudinal bars 32 which, at their front ends in the direction of travel, are respectively joined together U-shaped by means of a cross-web 30a or 32a, and may also be joined one with the other. As already shown in principle in FIG. 1, mounted on the outer longitudinal bars 30 is a swivelling part 34 which is swivellable around a swivelling axis A, orthogonal to the longitudinal central plane of the luggage carrier, in the direction of the double rotating arrow R, and is slidable in the direction of the double arrow S. In each sliding direction the swivelling part 34 is securable with respect to the supporting frame 20. The swivelling part 34 is designed—as will be seen in FIG. 2—as a stirrup the legs 34a of which are joined together by means of a web 34b. The free ends of the legs 34a are swivellably mounted respectively in one swivelling and sliding unit 36. The swivelling and sliding units 36 are slidable and securable in the longitudinal direction of the outer guide bars 30.

Figures 3, 4:
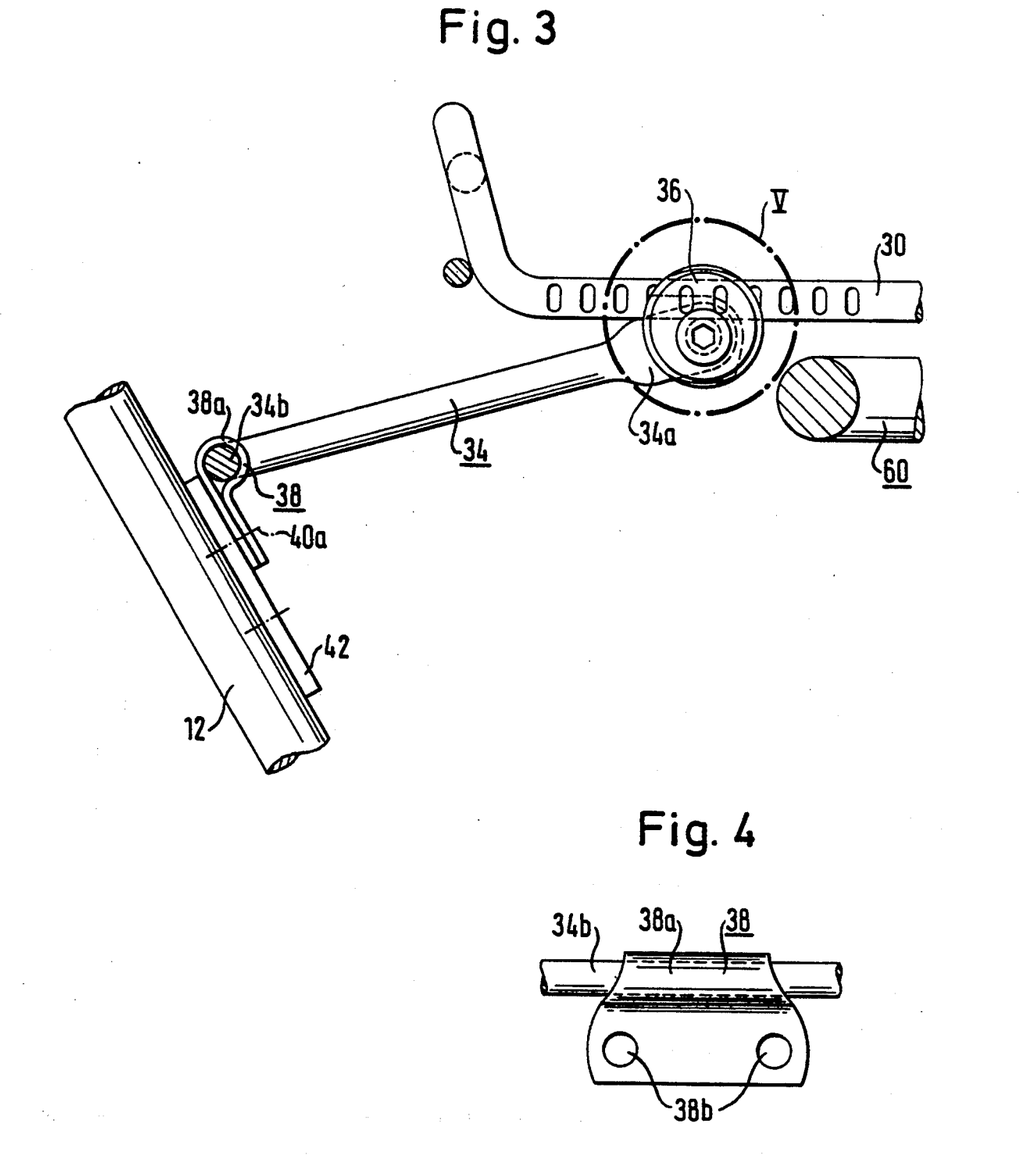
FIG. 3 is a magnified side view of FIG. 1 in the area III of FIG. 1.
FIG. 4 is a view of an assembly bracket in the direction of arrow IV of FIG. 2.

Mounted on the web part 34b of the swivelling part 34 is a mounting bracket 38 which can be recognized in detail in FIGS. 3 and 4. The mounting bracket is made of twin-lay sheet metal which forms at the crown a bearing eye 38a which surrounds in articulated manner the web part 34b. The mounting bracket 38—as shown in FIG. 1—can be fixed by means of fixing screws 40a to a bridging web 42 of the pair of bars 12. The fixing screws 40a pass through securing holes 38b of the mounting bracket 38.

A look at FIG. 1 will reveal straightaway that, in spite of the rigid connection of the supporting frame supports 22 and 24 with the supporting frame 20 as shown in the example of embodiment, an adaptation to any desired inclination of the pair of bars 12 and to any desired position in height of the bridging webs 42 is possible, there remaining a degree of freedom permitting the setting of desired inclinations of the supporting frame 20 relative to the horizontal, particularly slight inclinations to the front and to the rear, as frequently desired and usual with luggage carriers.

It will also be seen on looking at FIG. 1 that, with the rigid connection of the supporting frame supports 22, 24 with the supporting frame 20 a clear positioning of the luggage carrier 18 relative to the bicycle frame 10 is supplied at the outset if, after the adjustment of the luggage carrier into a desired position, the axis A is set in the sliding direction S along the supporting frame 20; in other words: in the case of the example a rotational locking of the swivelling part 34 relative to the supporting frame 20 is not necessary in order to secure rigidly the luggage carrier 18 in a definite position on the bicycle frame 10.

Figure 5:
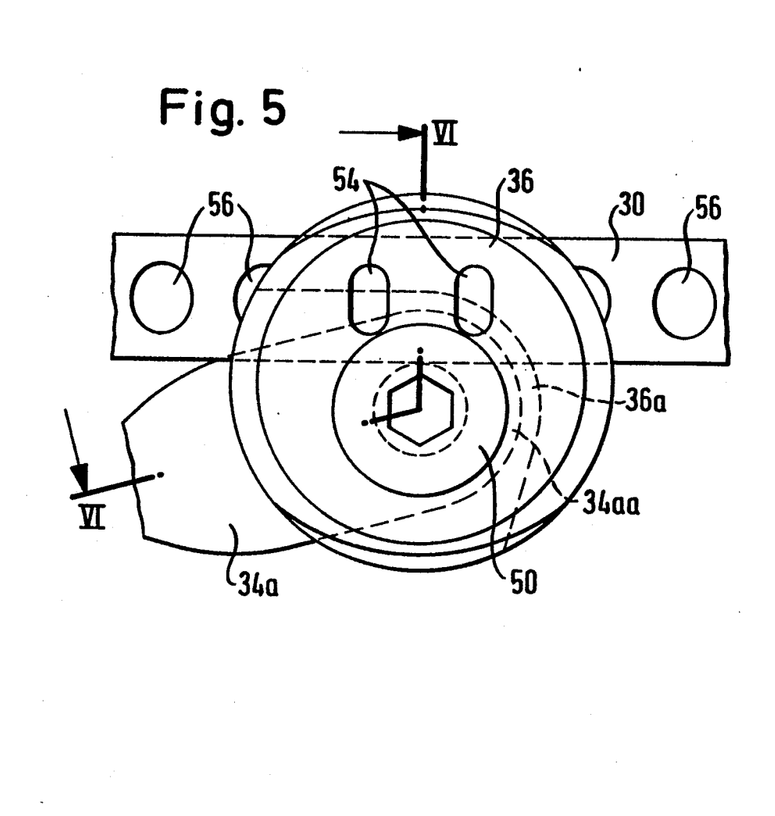
FIG. 5 is a magnified view of area V of FIG. 3.
Figure 6:
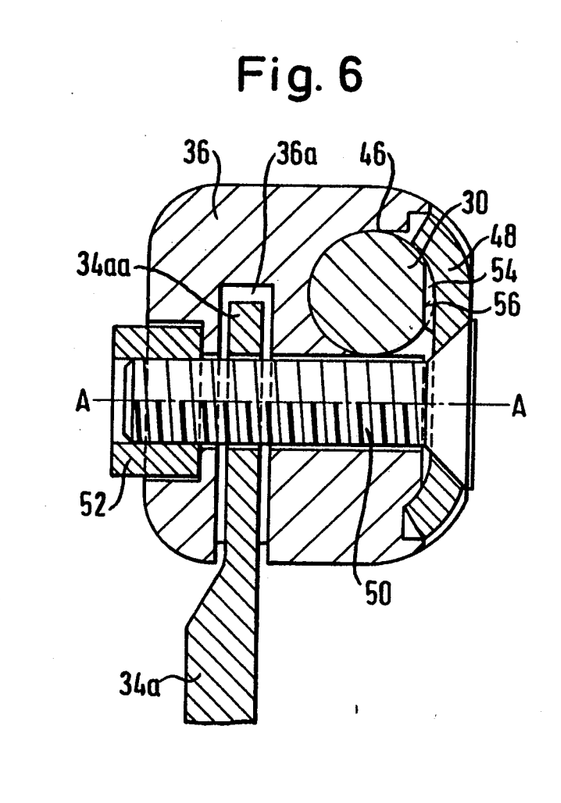
FIG. 6 is a section along line VI—VI of FIG. 5.

As, however, other luggage carrier constructions are also taken into consideration, in which the supporting frame supports 22, 24 are swivellably mounted on the supporting frame 20, so that they can be folded in the plane of the drawing of FIG. 1 onto the supporting frame 20, there exists also the possibility of securing the swivelling part 34 about the rotating axis A relative to the supporting frame 20. Reference will now be made to FIGS. 3, 5 and 6. There will be seen in them, in association with each of the outer longitudinal bars 30 and with each of the legs 34a of the swivelling part 34, respectively one swivelling and sliding unit 36. The swivelling and sliding unit 36 shows a guide 46 which is slidable on the associated longitudinal bar 30 and is open to the right in FIG. 6. The swivelling and sliding unit 36 is covered on its defining surface, on the right-hand side in FIG. 6, by a clamping plate 48 which, by means of a clamping screw 50, is clamped with the swivelling and sliding unit 36. The clamping screw 50 which is designed as a socket head cap screw cooperates with a clamp nut 52 which is preferably polygonal and is irrotatably housed in the swivelling and sliding unit. By tightening the clamping screw 50 the swivelling and sliding unit 36 is secured on the longitudinal bar 30 in its longitudinal direction and in fact not only by frictional seating, but also by positive engagement. The positive engagement is ensured in that on the clamping plate 48 ribs 54 are formed by embossing and are able to engage into recesses 56 of the longitudinal bar 30 when the swivelling and sliding unit 36 has been brought into a desired position and thereafter the clamping screw 50 is tightened.

FIG. 6 shows further that the legs 34a are received by their front ends 34aa by slots 36a and are swivellably mounted on the stems of the clamping screw 50. On tightening the clamping screw 50 the receiving slot 36a is constricted, so that the swivellability of the legs 34a relative to the swivelling and sliding units 36 and therefore relative to the supporting frame 20 is suppressed. Naturally, on the ends of the legs 34a and on the limiting surfaces of the receiving slots 36a, positive locking means may also be provided in the form of ribs and recesses which permit a positive fixing of the legs 34a relative to the swivelling and sliding units 36.

As may be seen in FIG. 1, the supporting frame 20 also serves at the same time as a support for a clip lock 60 which consists of a lock shackle 60a and a lock body 60b. The lock body 60b receives the two leg ends of the lock shackle 60a and can either be fully separated from the shackle 60a or pulled up to such an extent that the connection is maintained with one branch of the shackle but the connection with the end of the other branch becomes detached, and the lock body 60b is rotatable about the one branch of the shackle. The clip lock 60—as may be seen in FIG. 1—is taken up from the rear, i.e. from the right, into a guide (F) which is formed by cross-wires 62. The lock can be pushed into this guide F to such a distance that the lock body 60b strikes against a strike wire 64. Then, at the same time a securing element 66 engages behind the lock body 60b so that the clip lock 60 cannot be removed inadvertently from the guide F. By deflecting the securing element 66 the clip lock 60 can be removed when desired. It will be seen that the lock 60 lies under the supporting plane of the supporting frame 20 which is defined by the upper surface regions of the longitudinal bars 30, 32, so that the clip lock 60, even when the luggage carrier is loaded, can be mounted on it and removed from it.

In FIG. 1, by means of telescopic supports 68, it is diagrammatically indicated that the supporting frame supports 24 can also be lengthened and shortened, this, however, not being necessary in many cases.

Deviating from the examples of embodiment described so far it is also conceivable to mount in the swivelling and sliding units 36 individual swivelling arms which can be secured individually on the two fork bars of the pair of fork bars 12. For this purpose the ends of the individual swivelling arms may be so angled as to be approximately parallel with the bridging bracket 42, it being possible to effect fine settings by bending.

As an alternative to the form of embodiment shown in FIG. 6 it is possible to provide the locking ribs 54 on the surface of the sliding guide 46 opposite the clamping plate 48 instead of on the clamping plate itself. In this case, the engagement notches 56 are provided in a longitudinal area of the longitudinal bar 30 which lies diametrically opposite the notches 56 of FIG. 6. Whereas in FIGS. 3 and 6 the notches 56 are provided on the outside of the longitudinal bar 30, in this alternative the notches 56 would be provided inside the bar 30. The notches would be invisible to an observer viewing the bicycle from the side, so that the appearance of the luggage carrier would be improved, and the danger of injury to the use from contact with the notches would be reduced. Also, the clamping effect is better with the alternative form of embodiment.

Figure 6A:
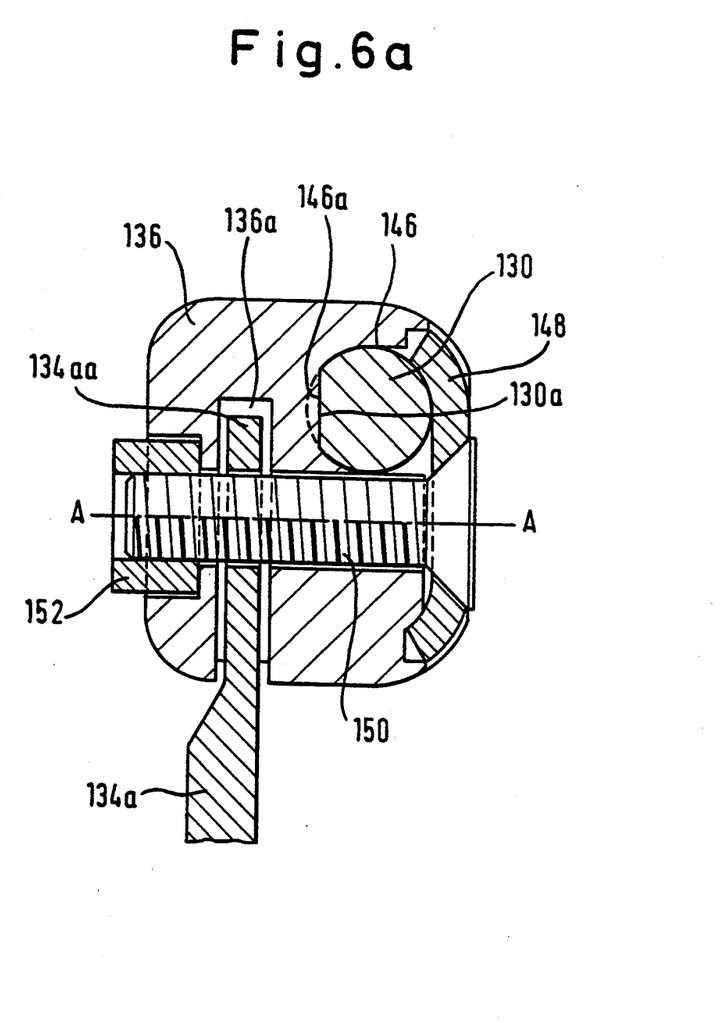
FIG. 6a is a section according to FIG. 6 in a modified embodiment.

Such a modified embodiment is shown in FIG. 6a. Analogous parts are designated by the same reference numerals as in FIG. 6 increased by 100.

One can see that in this modified embodiment, the sliding guide 146 is provided with locking engagement teeth 146a, which are engaged with respective notches 130a of the bar 130. The notches 130a are distributed along at least a section of the bar 130.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A luggage carrier for a two-wheel vehicle, comprising:
    a supporting frame (20) having a longitudinal central plane, a first end and a second end spaced from each other along said longitudinal central plane, said supporting frame (20) defining a virtual supporting surface with a luggage side and a luggage remote side;
    supporting frame stay means (22, 24) provided on said supporting frame (20) on substantially said luggage remote side of said virtual supporting surface, said supporting frame stay means (22, 24) including means for being fastened to a vehicle frame (10) adjacent a wheel receiving area (14) of said vehicle frame (10);
    connecting means (34, 36, 38) provided on said supporting frame (20) adjacent said first end of said supporting frame, said connecting means (34, 36, 38) including means for being connected to said vehicle frame (10) at a location (42) remote from said wheel receiving area (14), said connecting means comprising at least one swivelling part (34a) having a supporting-frame-side end portion (34aa) and a vehicle-frame-side end portion (34b);
    at least one swivelling and sliding unit (36, 48, 50) in which said supporting-frame-side end portion (34aa) of said swivelling part (34a) is swivellably mounted about an axis substantially perpendicular to said longitudinal central plane;
    a longitudinal bar member (30) of said supporting frame (20) extending in a direction substantially parallel to said longitudinal central plane, said swivelling and sliding unit being guided along said longitudinal bar member (30); and
    a securing means (54, 56, 50) for securing said swivelling and sliding unit (36, 48, 50) in a selected position along said longitudinal bar member (30).

2. A luggage carrier as set forth in claim 1, wherein said securing means comprises a force-fit securing means (46).

3. A luggage carrier as set forth in claim 1, wherein said securing means comprises a positively engageable securing means (54, 56).

4. A luggage carrier as set forth in claim 1, wherein said swivelling part (34a) is securable against swivelling movement with respect to said swivelling and sliding unit (36, 48, 50).

5. A luggage carrier as set forth in claim 4, wherein said swivelling part (34a) is securable against swivelling movement with respect to said swivelling and sliding unit (36, 48, 50) by swivel preventing means (36a, 50), said swivel preventing means and said securing means (54, 56, 50) for securing said swivelling and sliding unit (36, 48, 50) in a selected position along said bar member (30) comprising at least one common securing and swivel preventing component (50, 52).

6. A luggage carrier as set forth in claim 5, at least one said common securing and swivel preventing component (50, 52) comprising common actuating means (50) for concurrently securing said swivelling and sliding unit (36, 48, 50) in a selected position along said bar member (30) and securing said swivelling part (34a) against swivelling movement.

7. A luggage carrier as set forth in claim 1, wherein:
    said supporting frame (20) includes two longitudinal bar members (30) substantially parallel to said longitudinal central plane, one longitudinal bar member (30) being located on each side of said central plane; and
    a swivelling and sliding unit (36, 48, 50) provided on each of said two longitudinal bar members (30).

8. A luggage carrier as set forth in claim 7, wherein each of said swivelling and sliding units (36, 48, is connected with a respective individual swivelling part (34a).

9. A luggage carrier as set forth in claim 8, wherein each said individual swivelling part (34a) comprises an individual swivelling arm having a bent vehicle-frame-side end portion for being secured to respective fork member of a frame unit (12) extending between a rear wheel hub accommodating portion (14) of a vehicle frame (10) and a saddle tube.

10. A luggage carrier as set forth in claim 7 further comprising a common swivelling part (34) provided for both of said swivelling and sliding units (36, 48, 50).

11. A luggage carrier as set forth in claim 10, wherein said common swivelling part (34) is a substantially U-shaped shackle (34).

12. A luggage carrier as set forth in claim 11, wherein:
    said U-shaped shackle (34) includes a middle portion (34b) adjacent said shackle's vehicle-frame-side end portion; and
    wherein said middle portion (34b) includes a mounting bracket (38) for attachment to said vehicle frame (10).

13. A luggage carrier as set forth in claim 13, wherein said mounting bracket (38) is rotatably mounted on said middle portion (34b).

14. A luggage carrier as set forth in claim 13, wherein said vehicle frame (10) comprises a rear wheel hub accommodating portion (14), a saddle tube and a fork-shaped frame unit having two fork arms extending between said rear wheel hub accommodating portion (14) and said saddle tube; said luggage carrier further comprising:
    a bridging web (42) bridging said two fork arms of said fork-shaped frame unit; and
    wherein said mounting bracket (38) includes means for being fastened to said bridging web (42).

15. A luggage carrier as set forth in claim 1, wherein said vehicle frame (10) has a rear wheel hub accommodating portion (14), a saddle tube and a frame unit (12) extending between said rear wheel hub accommodating portion (14) and said saddle tube, said supporting frame stay means (22, 24) being adapted for being fastened to said rear wheel hub accommodating portion (14), and said connecting means (36, 34, 38) being adapted for being connected to said frame unit (12).

16. A luggage carrier as set forth in claim 9, wherein said bent end portions are swivellable with respect to said respective swivelling arms (34a) about respective swivelling axis substantially orthogonal with respect to said longitudinal central plane.

17. A luggage carrier as set forth in claim 16, wherein said end portions are swivellable with respect to said respective swivelling arms (34a) by material bending.

18. A luggage carrier as set forth in claim 1, further comprising:
   a mounting bracket (38) provided on said at least one swivelling part (34a);
   wherein said mounting bracket (38) is pivotally mounted with respect to said at least one swivelling part (34a) at the vehicle-frame-side end portion of said swivelling part, and said mounting bracket (38) is adapted for being fastened to said vehicle frame (10).

19. A luggage carrier as set forth in claim 18, wherein said mounting bracket (38) is formed from a twin-lay metal strip (38), said mounting bracket having at its crown region a bearing eye (38a).

20. A luggage carrier as set forth in claim 1, wherein said supporting frame stay means (22, 24) is rigidly connected with said supporting frame (20).

21. A luggage carrier as set forth in claim 1, wherein said supporting frame stay means (22, 24) is connected to the supporting frame (20) via a hinge means.

22. A luggage carrier as set forth in claim 1, further comprising an accommodating means (62, 64, 66) on said supporting frame (20) for accommodating a vehicle lock (60).

23. A luggage carrier as set forth in claim 22, wherein said accommodating means (62, 64, 66) is provided on the luggage remote side of said virtual supporting surface.

24. A luggage carrier as set forth in claim 1, wherein the length of said supporting frame stay means (22, 24) is adjustable.

25. A luggage carrier for a two-wheel vehicle, comprising:
   a supporting frame (20) having a longitudinal central plane and a first end and a second end spaced from each other along said longitudinal central plane, said supporting frame (20) defining a virtual supporting surface with a luggage side and a luggage remote side;
   a longitudinal bar member (30) of said supporting frame (20) extending in a direction substantially parallel to said longitudinal central plane;
   supporting frame stay means (22, 24) provided on said supporting frame (20) on substantially said luggage remote side of said virtual supporting surface, said supporting frame stay means (22, 24) including means for being fastened to a vehicle frame (10) adjacent a wheel receiving area (14) of said vehicle frame (10);
   connecting means (34, 36, 38) provided on said supporting frame (20) adjacent said first end of said supporting frame, said connecting means (34, 36, 38) including means for being connected to said vehicle frame (10) at a location (42) remote from said wheel receiving area (14), said connecting means comprising at least one swivelling part (34a) having a supporting-frame-side end portion (34aa) and a vehicle-frame-side end portion (34b);
   at least one swivelling and sliding unit (36, 48, 50) in which said supporting-frame-side end portion (34aa) of said swivelling part (34a) is swivellably mounted about an axis substantially perpendicular to said longitudinal central plane, said swivelling and sliding unit (36, 48, 50) comprising two bar engagement members (36, 48) which define a passage for said longitudinal bar (30), said swivelling and sliding unit being guided along said longitudinal bar member (30); and
   a securing means (54, 56, 50) for securing said swivelling and sliding unit (36, 48, 50) in a selected position along said longitudinal bar member (30).

26. A luggage carrier as set forth in claim 25, wherein said swivelling and sliding unit (36, 48, 50) further comprises a securing bolt (50) for maintaining said bar engagement members (36, 48) in engagement with said longitudinal bar (30).

27. A luggage carrier as set forth in claim 26, wherein said securing bolt (50) is a pivot bolt for said swivelling part (34a).

28. A luggage carrier as set forth in claim 27, wherein said swivelling and sliding unit (36, 48, 50) has a slot (36a) for receiving said supporting-frame-side end portion (34aa) of said swivelling part (34a), said securing bolt (50) transverses engaging said slot (36a), and said supporting-frame-side end portion (34aa) is clampable within said slot (36a) against said swivelling and sliding unit (36) by tightening said securing bolt (50).

29. A luggage carrier as set forth in claim 25 further comprising:
   a positive counter-engagement means (56) provided on said longitudinal bar (30); and
   a positive engagement means (54) provided on at least one (48) of said bar engagement members (36, 48) for engagement with said positive counter-engagement means (56).

30. A luggage carrier as set forth in claim 29 further comprising:
   a securing bolt (50) interconnecting said bar engagement members (36, 48);
   wherein said positive engagement means (54) and said counter-engagement means (56) are engageable with each other in response to tightening of said securing bolt (50).

31. A luggage carrier as set forth in claim 25, wherein one (36) of said bar engagement members (36, 48) is shaped as a bearing block in which said swivelling part (34a) is swivellably mounted, and the other one (48) of said bar engagement members (36, 48) is shaped as a clamping plate.

* * * * *

UNITED STATES PATENT AND TRADEMARK OFFICE
CERTIFICATE OF CORRECTION

PATENT NO. : 5,411,190
DATED : May 2, 1995
INVENTOR(S) : Ludger Kortenbrede

It is certified that error appears in the above-indentified patent and that said Letters Patent is hereby corrected as shown below:

Col. 3, line 58, "types" should read --tyres--;
Col. 3, line 61, "28' wheels" should read --28" wheels--;
Col. 3, line 62, "26'" should read --26"--;
Col. 5, line 41, "Reference will..." should start a new paragraph;
Col. 6, line 60, "use" should read --user--;
Col. 8, line 17, "(36, 48," should read --(36, 48, 50)--;
Col. 8, line 41, "claim 13" should read --claim 12--;
Col. 8, line 67, "axis" should read --axes--.

Signed and Sealed this

Tenth Day of October, 1995

Attest:

BRUCE LEHMAN

Attesting Officer

Commissioner of Patents and Trademarks